US010887182B1

(12) United States Patent
Xie et al.

(10) Patent No.: US 10,887,182 B1
(45) Date of Patent: Jan. 5, 2021

(54) SYSTEM AND METHOD FOR PAIRWISE NETWORK ALIGNMENT

(71) Applicant: HRL Laboratories, LLC, Malibu, CA (US)

(72) Inventors: Daniel K. Xie, Sugar Land, TX (US); Jiejun Xu, Diamond Bar, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/296,196

(22) Filed: Mar. 7, 2019

Related U.S. Application Data

(60) Provisional application No. 62/669,679, filed on May 10, 2018.

(51) Int. Cl.
*G06F 13/28* (2006.01)
*G06K 9/00* (2006.01)
*H04L 12/24* (2006.01)

(52) U.S. Cl.
CPC .............. *H04L 41/12* (2013.01); *H04L 41/02* (2013.01); *H04L 41/04* (2013.01); *H04L 41/0813* (2013.01); *H04L 41/0866* (2013.01)

(58) Field of Classification Search
CPC ...... G06N 3/08; G06N 3/0454; G06N 3/0472; G06N 3/0481; G06N 3/02; G06N 20/00; H04L 41/12; H04L 41/02; H04L 41/04; H04L 41/0813; H04L 41/0866
USPC ....................................................... 709/223
See application file for complete search history.

(56) References Cited

U.S. PATENT DOCUMENTS

| | | | |
|---|---|---|---|
| 9,530,047 B1* | 12/2016 | Tang | G06K 9/00288 |
| 9,836,691 B1* | 12/2017 | Narayanaswami | G06N 3/04 |
| 2014/0280548 A1* | 9/2014 | Langlois | H04L 67/306 |
| | | | 709/204 |
| 2015/0293997 A1* | 10/2015 | Smith | G06Q 50/01 |
| | | | 707/749 |
| 2018/0129937 A1* | 5/2018 | Bradbury | G06N 3/0445 |
| 2018/0129938 A1* | 5/2018 | Xiong | G06N 3/08 |
| 2019/0065817 A1* | 2/2019 | Mesmakhosroshahi | |
| | | | G06K 9/6271 |
| 2019/0108444 A1* | 4/2019 | Song | G06N 3/0481 |
| 2019/0265955 A1* | 8/2019 | Wolf | G06N 3/084 |
| 2020/0104746 A1* | 4/2020 | Strope | G06N 20/00 |

OTHER PUBLICATIONS

Stanford, "Introduction to Convolutional Neural Networks", Feb. 2018, stanford.edu, web.stanford.edu/class/cs231a/lectures/intro_cnn.pdf (Year: 2018).*

(Continued)

*Primary Examiner* — Ruolei Zong
(74) *Attorney, Agent, or Firm* — Tope-McKay & Associates

(57) ABSTRACT

This disclosure provides a system for pairwise network alignment. In operation, the system receives datasets from two networks, each network having a plurality of nodes. The two networks are embedded based on multi-layer graph convolution to generate network embeddings. An inner product similarity score is generated between the two networks based on an inner product of the network embeddings. Next, a node correspondence is estimated between the two networks using a SoftMax function on the inner product similarity score. Finally, the two networks are aligned on the node correspondence.

15 Claims, 6 Drawing Sheets

(56) References Cited

OTHER PUBLICATIONS

J. Coleman, E. Katz, and H. Menzel. The diffusion of an innovation among physicians. Sociometry, 20(4): pp. 253-270, 1957.
M. Defferrard, X. Bresson, and P. Vandergheynst. Convolutional neural networks on graphs with fast localized spectral filtering. In Advances in Neural Information Processing Systems, pp. 3844-3852, 2016.
W. L. Hamilton, R. Ying, and J. Leskovec. Representation learning on graphs: Methods and applications. arXiv preprint arXiv:1709.05584, pp. 1-24, 2017.
B. P. Kelley, B. Yuan, F. Lewitter, R. Sharan, B. R. Stockwell, and T. Ideker. Pathblast: a tool for alignment of protein interaction networks. Nucleic acids research, 32(suppl 2): pp. W83-W88, 2004.
D. Koutra, H. Tong, and D. Lubensky. Big-Align: fast bipartite graph alignment. In 2013 IEEE 13th International Conference on Data Mining, Dallas, TX, USA, Dec. 7-10, 2013, pp. 389-398, 2013.
B. Perozzi, R. Al-Rfou, and S. Skiena. Deepwalk: Online learning of social representations. In Proceedings of the 20th ACM SIGKDD international conference on Knowledge discovery and data mining, pp. 701-710. ACM, 2014.
R. Singh, J. Xu, and B. Berger. Global alignment of multiple protein interaction networks with application to functional orthology detection. Proceedings of the National Academy of Sciences, 105(35): pp. 12763-12768, 2008.
S. Zhang and H. Tong. Final: Fast attributed network alignment. In Proceedings of the 22nd ACM SIGKDD International Conference on Knowledge Discovery and Data Mining, pp. 1345-1354. ACM, 2016.
Mixed polygon Mesh Dataset, found at http://www.holmes3d.net/graphics/offfiles/, published on Dec. 9, 2004, downloaded on Apr. 24, 2019.

* cited by examiner

| Network 1 | Network 2 | Nodes 1 | Nodes 2 | SCAN | FINAL | IsoRank | UniAlign |
|---|---|---|---|---|---|---|---|
| Physician (1) | Physician (2) | 215 | 231 | .343 | .179 | .340 | .009 |
| Apple Mesh | Corrupted Apple | 891 | 891 | .867 | .425 | .981 | .156 |
| Douban (Offline) | Douban (Online) | 1118 | 3906 | .705 | .430 | .220 | .020 |
| Flickr | Myspace | 6714 | 10733 | .759 | .720 | .400 | .030 |

FIG. 4

SYSTEM AND METHOD FOR PAIRWISE NETWORK ALIGNMENT

CROSS-REFERENCE TO RELATED APPLICATIONS

This application claims the benefit of and is a non-provisional patent application of U.S. Provisional Application No. 62/669,679, filed on May 10, 2018, the entirety of which is hereby incorporated by reference.

GOVERNMENT RIGHTS

This invention was made with government support under U.S. Government Contract Number FA8750-17-C-0153. The government has certain rights in the invention.

BACKGROUND OF INVENTION

(1) Field of Invention

The present invention relates to network alignment system and, more specifically, to a system for pairwise network alignment based on graph convolution.

(2) Description of Related Art

The present disclosure is generally directed to network alignment. Network alignment was originally studied in bioinformatics. Early methods such PathBLAST (see the List of Incorporated References, Literature Reference No. 4) were inspired by sequence alignment and used dynamic programming methods to obtain heuristic solutions. These methods are computationally expensive and depend heavily on obtaining a good similarity function between nodes in two networks to function well.

Another technique, IsoRank (see Literature Reference No. 7), is a popular method that also came out of bioinformatics. The IsoRank method takes into account both topology and similarity between nodes in two networks, but like PathBLAST, also heavily depends on the similarity function to work well. Notably, IsoRank operates by solving an eigenvalue equation using an iterative algorithm to obtain a solution, which can be computationally expensive.

Yet another technique, FINAL (see Literature Reference No. 8), is a recent alignment method that takes into account both node and edge level as well as topology for alignment. The FINAL method assumes alignment consistency between two networks, that is, it is assumed that two nodes are aligned if their node, edge, and topological features are similar. FINAL function incorporates these three classes of features, showing good results on standard datasets.

Various other methods such as UniAlign and BigAlign (a variant of UniAlign) (see Literature Reference No. 5) simply assume that the adjacency matrix of one network is a noisy permutation of that of the other. While somewhat operable, such assumptions are not always accurate and can lead to erroneous results.

Thus, a continuing need exists for a system that performs network alignment using a general machine learning paradigm and that does not assume direct node or edge consistency between two networks.

SUMMARY OF INVENTION

This disclosure provides a system for pairwise network alignment. In various embodiments, the system includes one or more processors and a memory. The memory is a non-transitory computer-readable medium having executable instructions encoded thereon, such that upon execution of the instructions, the one or more processors perform several operations, including receiving datasets from two networks, each network having a plurality of nodes; embedding the two networks based on multi-layer graph convolution to generate network embeddings; generating an inner product similarity score between the two networks based on an inner product of the network embeddings; estimating a node correspondence between the two networks using a SoftMax function on the inner product similarity score; and aligning the two networks based on the node correspondence.

In another aspect, the two networks are social media platforms and aligning the two networks includes modifying nodes by adding user attributes to nodes in each of the social media platforms such that user attributes are common to both social media platforms.

In yet another aspect, the two networks are embodied as two different languages (e.g., a high-resource language and a low-resource language), such that aligning the two networks results in a translation between words in the two different languages.

In yet another aspect, the two networks are embodied as two images from distinct modalities, each of which has a plurality of pixels, such that aligning the two networks results in a mapping between pixels in the two images. In this aspect and in one example embodiment, the system also performs an operation of modifying the two images by swapping one or more pixels between the two images.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table depicting benchmark results for alignment experiments using four pairs of networks;

DETAILED DESCRIPTION

Figure 1:
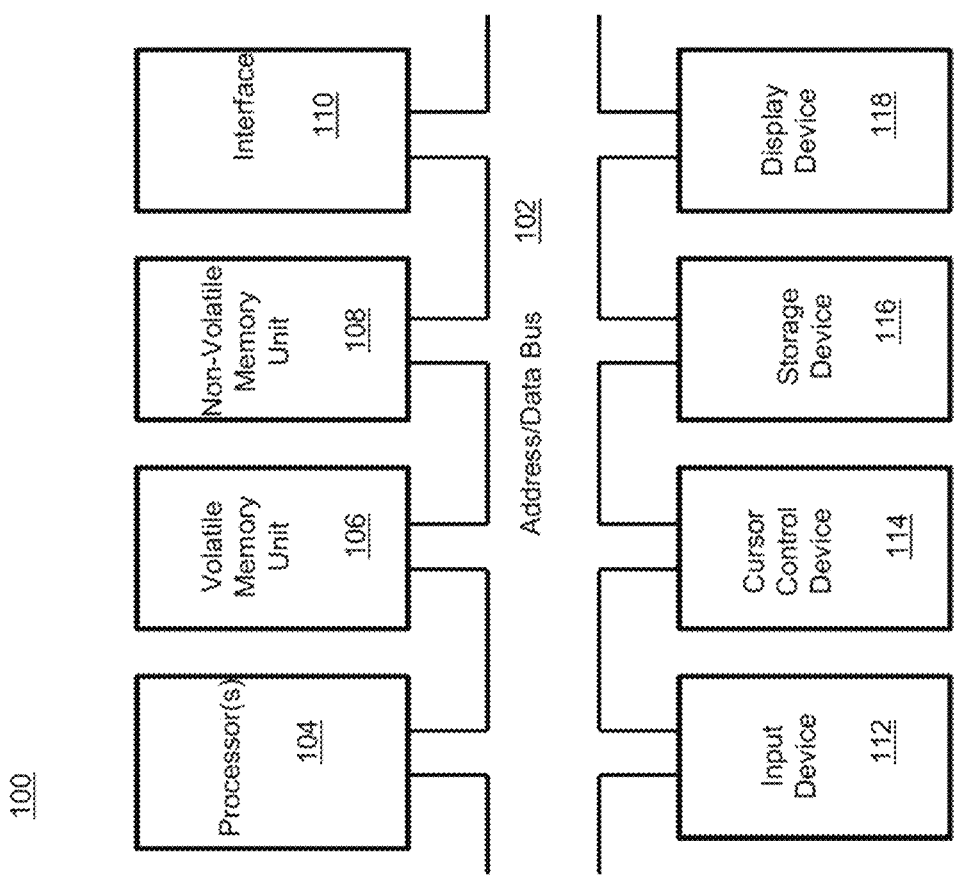
FIG. 1 is a block diagram depicting the components of a system according to various embodiments of the present invention.

The present invention relates to a network alignment system and, more specifically, to a system for pairwise network alignment based on graph convolution. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. J. Coleman, E. Katz, and H. Menzel. The diffusion of an innovation among physicians. *Sociometry*, 20(4):253-270, 1957.
2. M. Defferrard, X. Bresson, and P. Vandergheynst. Convolutional neural networks on graphs with fast localized spectral filtering. In *Advances in Neural Information Processing Systems*, pages 3844-3852, 2016.
3. W. L. Hamilton, R. Ying, and J. Leskovec. Representation learning on graphs: Methods and applications. *arXiv preprint arXiv:*1709.05584, 2017.
4. B. P. Kelley, B. Yuan, F. Lewitter, R. Sharan, B. R. Stockwell, and T. Ideker. Pathblast: a tool for alignment of protein interaction networks. *Nucleic acids research*, 32(suppl 2): W83-W88, 2004.
5. D. Koutra, H. Tong, and D. Lubensky. BIG-ALIGN: fast bipartite graph alignment. In 2013 *IEEE* 13*th International Conference on Data Mining, Dallas, Tex. USA*, Dec. 7-10, 2013, pages 389-398, 2013.
6. B. Perozzi, R. Al-Rfou, and S. Skiena. Deepwalk: Online learning of social representations. In *Proceedings of the* 20*th ACM SIGKDD international conference on Knowledge discovery and data mining*, pages 701-710. ACM, 2014.
7. R. Singh, J. Xu, and B. Berger. Global alignment of multiple protein interaction networks with application to functional orthology detection. *Proceedings of the National Academy of Sciences*, 105(35):12763-12768, 2008.
8. S. Zhang and H. Tong. Final: Fast attributed network alignment. In *Proceedings of the* 22*nd ACM SIGKDD International Conference on Knowledge Discovery and Data Mining*, pages 1345-1354. ACM, 2016.
9. Mixed-polygon Mesh Dataset, found at http://www.holmes3d.net/graphics/offfiles/Models.zip, taken on Mar. 6, 2019.

(2) Principal Aspects

Various embodiments of the invention include three "principal" aspects. The first is a system for pairwise network alignment. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
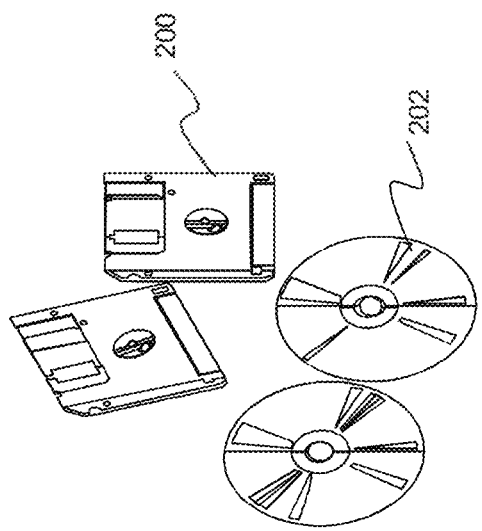
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a new method to address the pairwise network (or graph) alignment problem, where the goal is to identify the node correspondence across the networks. The described process leverages recent advances in graph convolution network (see Literature Reference No. 2 for a discussion of graph convolution network) and representation learning (see Literature Reference No. 3 for a discussion of representation learning). Specifically, the described method extends the general encoder-decoder framework by first learning a common low-dimensional representation/embedding for both input networks (i.e., encoding) using a graph convolution filter. Unlike conventional embedding methods (e.g., DeepWalk (see Literature Reference No. 6)), which only consider graph topology, the method of the present disclosure takes into account both local network topology and node attributes in a supervised manner. Once the embedding space is estimated, the system identifies the initial pairwise node correspondence by taking the inner product of the coordinates of the nodes (i.e., decoding). Finally, the output is fed into a categorical SoftMax function to obtain a more accurate estimate of the probabilities of node matches.

The system of the present disclosure is the first to address network alignment using the graph convolution framework and, in doing so, determine the pairwise correspondence between nodes from two networks. A key advantage of the alignment method is that it allows two disparate types of networks to be aligned. Existing network alignment methods such as FINAL (as described in Literature Reference No. 8) that incorporate node feature information expect the features to correspond in both graphs to be aligned. By contrast, the process of the present disclosure does not require the features to correspond, allowing the system to align networks with dissimilar feature information. The present method is also extensible and modular, which allows for incorporation of different alignment criteria and conditions. Specific details are provided below.

(4) Specific Details of Various Embodiments

Figure 3:
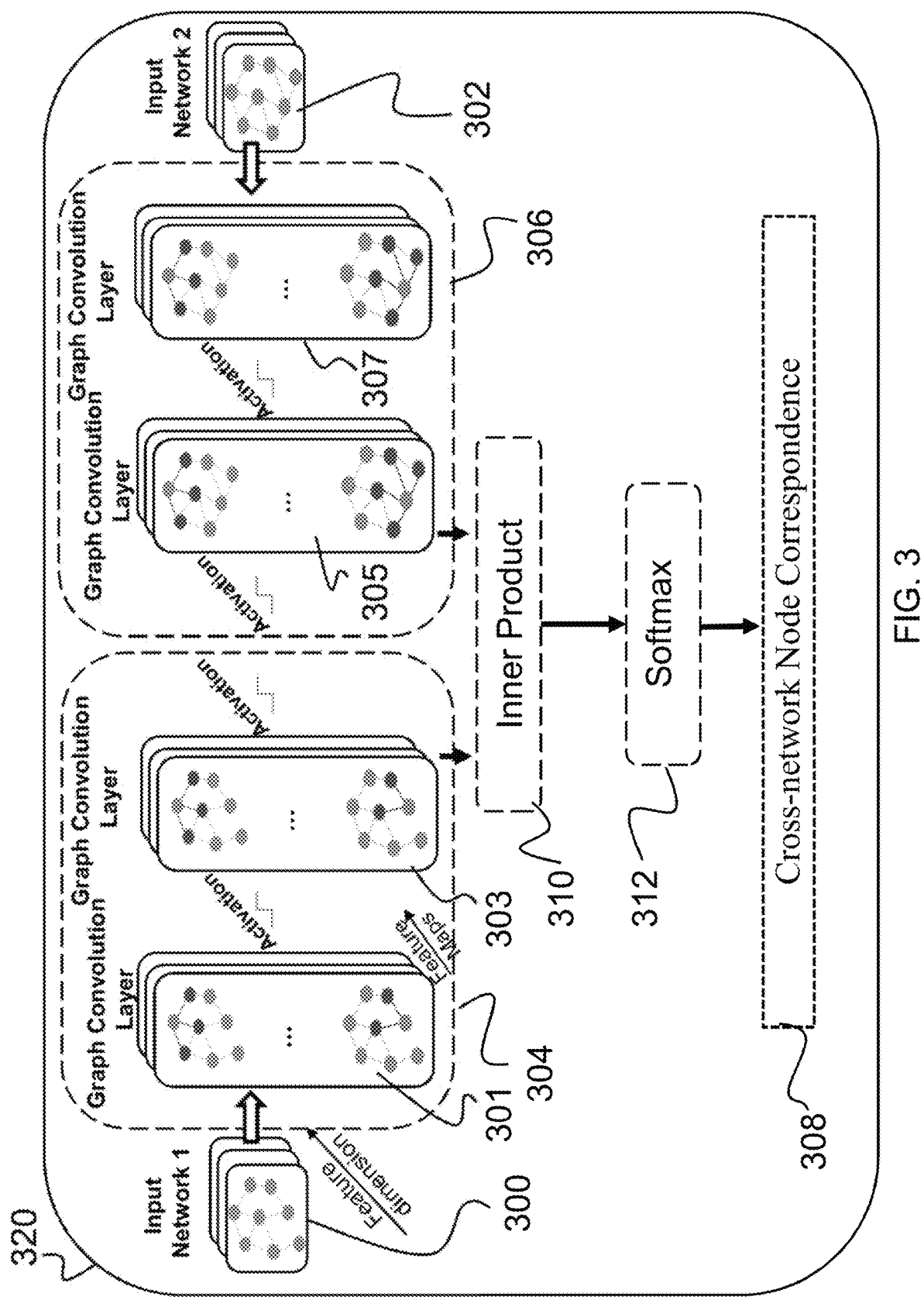
FIG. 3 is a graphical illustration of an architecture for pairwise network alignment according to various embodiments of the present invention.

The present disclosure provides a unique architecture based on graph convolutional networks to address the network alignment problem. FIG. 3, for example, provides a graphical illustration of an architecture for pairwise network alignment 320 according to various embodiments of the present invention. The embeddings of the input networks 300 and 302 are estimated via two-layer graph convolution networks 304 and 306. The node correspondences 308 are estimated based on the inner product 310 of the embeddings (followed by a SoftMax 312 function).

The architecture involves dually embedding both networks 300 and 302 to be aligned using several layers (depicted as elements 301, 303, 305, and 307) of graph convolutions, then using the embeddings to extract pairwise inner product 310 similarity scores. The architecture is an extension of a general encoder-decoder framework and is used for representation learning on graphs. In such formulations, an encoder is typically used to map nodes in the graph to a low-dimensional representation. The decoder then attempts to recover the structure of the graph given an encoding. Thus, the decoder can be thought of as an "interpretation" of the encoding. The present framework can be considered as an extension to the encoder/decoder type of framework. Instead of encoding one graph, however, the system of the present disclosure attempts to embed the nodes in both graphs into a low-dimensional representation. Meanwhile, instead of attempting to use the decoder to reconstruct the input graph, the embeddings are "interpreted" by taking the inner product of the dual embeddings to obtain scores for alignment.

For the one-to-one pairwise alignment problem, where $G_1=(V_1,E_1)$ and $G_2=(V_2,E_2)$, the method of the present disclosure focuses on the problem of being able to properly match nodes in $G_1$ to corresponding nodes in $G_2$. Both $G_1$ and $G_2$ are defined as networks, while $V_1$ and $E_1$ are the nodes and edges of $G_1$, respectively; and $V_2$ and $E_2$ are the nodes and edges of $G_2$, respectively. Without loss of generality, assume that $n_1=|V_1|<n_2=|V_2|$, where $n_1$ is the number of nodes in network $G_1$. The ground truth for matches between nodes in the two target networks can be stored in an $n_1 \times n_2$ matrix Y, where $Y(i,j)=1$ if there is a match between $i \in V_1$ and $j \in V_2$ and $Y(i,j)=0$ otherwise.

Assume that that the networks 300 and 302 come with $a_1$ attributes for each node on $G_1$ and $a_2$ attributes for each node on $G_2$. These attributes are not required to be similar on both networks as in other alignment methods such as that of IsoRank (see Literature Reference No. 7) and FINAL (see Literature Reference No. 8). If no attributes are provided, features for each node can always be obtained by using the coordinates of node embeddings from unsupervised embedding methods, such as DeepWalk (see Literature Reference No. 6). Even when attributes are already given, it is recommended to use such methods and concatenate those features to the original attributes to capture additional topological information regarding the target networks. This attribute information can be stored in two matrices $X_1$ and $X_2$, where $X_i$ is of dimensions $n_i \times a_i$.

Now, let $$F_1 = \left( \tilde{D}_1^{-\frac{1}{2}} (I_1 + A_1) \tilde{D}_1^{-\frac{1}{2}} \right)$$

and $$F_2 = \left( \tilde{D}_2^{-\frac{1}{2}} (I_2 + A_2) \tilde{D}_2^{-\frac{1}{2}} \right),$$

here $A_k$ is the corresponding adjacency matrix for graph k, $I_k$ is the identity matrix, and $\tilde{D}_k = \Sigma_j (I_k + A_k)_{ij}$. $\tilde{D}$ is basically a diagonal matrix for normalization, and the subscript K could even be skilled to simplify the notation. $F_1$ and $F_2$ are essentially the propagation rules in the graph neural network context. Basically, in each convolution layer, this step aggregates the feature information from a node's neighbors (and subsequently updates each node). The predictive model begins by embedding both networks 300 and 302 using graph convolutional layers 301, 303, 305, and 307. Let $U_i$ be the corresponding embedding for $G_i$. For a two-layer graph convolutional embedding (e.g., as depicted in elements 304 and 306):

$$U_i = \sigma(F_i \sigma(F_i X_i W^{(1)}) W^{(2)}),$$

where $\sigma$ is an activation function (typically ReLU) and $W^{(i)}$ contains filter weights to be learned for the $i^{th}$ layer, with weights $W^{(i)}$ being shared across $U_1$ and $U_2$. For a three-layer embedding, $$U_i = \sigma F_i (\sigma F_i (\sigma(F_i X_i W^{(1)}) W^{(2)}) W^{(3)}),$$

and higher order layer embeddings are given similarly.

The process then uses the embeddings to obtain probabilities for matches by applying a row-wise SoftMax 312 to a matrix containing the inner product 310 of individual node embeddings, as follows:

$$S = \text{softmax}(U_1^T U_2).$$

The final predictions are generated by examining the row-wise argmax of S to obtain candidate matches. Training of the model is done by minimizing the sum of the cross-entropies of the appropriate rows of S against provided rows of Y.

The method for alignment was tested against several other recent or popular methods for network alignment. In particular, results were obtained for benchmarking the method against IsoRank (see Literature Reference No. 7), UniAlign (see Literature Reference No. 5) (a variant of Big-Align), and FINAL (see Literature Reference No. 8) for network alignment. All methods were tested on a wide range of networks generated from various datasets.

The first dataset, which is referred to as the Physician dataset, is taken from a classic sociology paper (see Literature Reference No. 1) studying the adoption of a new drug among practicing physicians. As multiple types of relationships among the doctors are studied, different networks can be constructed, such as physician 1 and physician 2 (as depicted in FIG. 4). As multiple different types of relationships among the doctors are studied, different networks can be constructed. The task was to match the nodes across these networks. Several attributes are available for each doctor. Due to the presence of missing elements within the dataset and limited discrete ranges for all attributes, all attributes were one-hot encoded in this dataset.

The method was also benchmarked on a real-world, mixed-polygon mesh dataset, such as that found at Literature Reference No. 9_The process started with the original mesh (Apple), which comes with spatial coordinates. A "corrupted" version of the mesh (Corrupted Apple) was then constructed by adding Cauchy noise to all the spatial coordinates and randomly deleting a certain number of nodes and edges in the mesh. The task was to align the nodes in the corrupted mesh back to the original mesh.

The third network alignment problem uses information from a social media platform (e.g., Douban™). Two subnetworks of the larger Douban network are constructed: one using social relations on Douban, referred to as the Douban online network, and one using co-occurrence in social settings offline, referred to as the Douban offline network. The Douban social media data is notably richly attributed. The task was to determine the user correspondences from the two networks.

Finally, the fourth network for our experiment is derived from other social networks, including Flickr™ and Myspace™ social networks. Similar to the previous experiment, the task was to determine the user correspondences across networks.

FIG. 4 provides a table illustrating several benchmarks of the present method against several other methods for graph alignment. Note that "Nodes 1" and "Nodes 2" are the number of nodes in each of the networks, while the "SCAN" column provides the results for the method outlined in this disclosure. For example, the results for the SCAN method provides an alignment accuracy, with the higher alignment percentage being a better result. As a specific example, 34.3% as illustrated in the SCAN method on the Physician dataset means that the alignment accuracy is 34.3%.

In all datasets, 50% of the data was provided as already given for training. For methods that do not use training, such as IsoRank, the similarity score input was modified to maximize the matches on the already given data. The present method strongly outperformed all other methods on three out of the four datasets, including the Physician dataset and the two social media datasets. This result demonstrates the effectiveness of the present method on leveraging both the local topology and the node attributes for network alignment, particularly for social media data.

(5) Practical Applications

The method as described herein has several applications, such as big data analytics and open-source intelligence. The method can also be implemented in coordinated network data fusion to enable maximal exploitation of intelligence, surveillance, and reconnaissance (ISR) tasks. The method can also be used for sensor network fusion or where quality logistics and supply-chain network management are required, with the potential to reduce vehicle defects and detect trace counterfeit parts. Another application is in database entity alignment. When there are two networks based on database entity co-occurrence, the idea is to address the entity correspondence problem as a network alignment problem.

Figure 5:
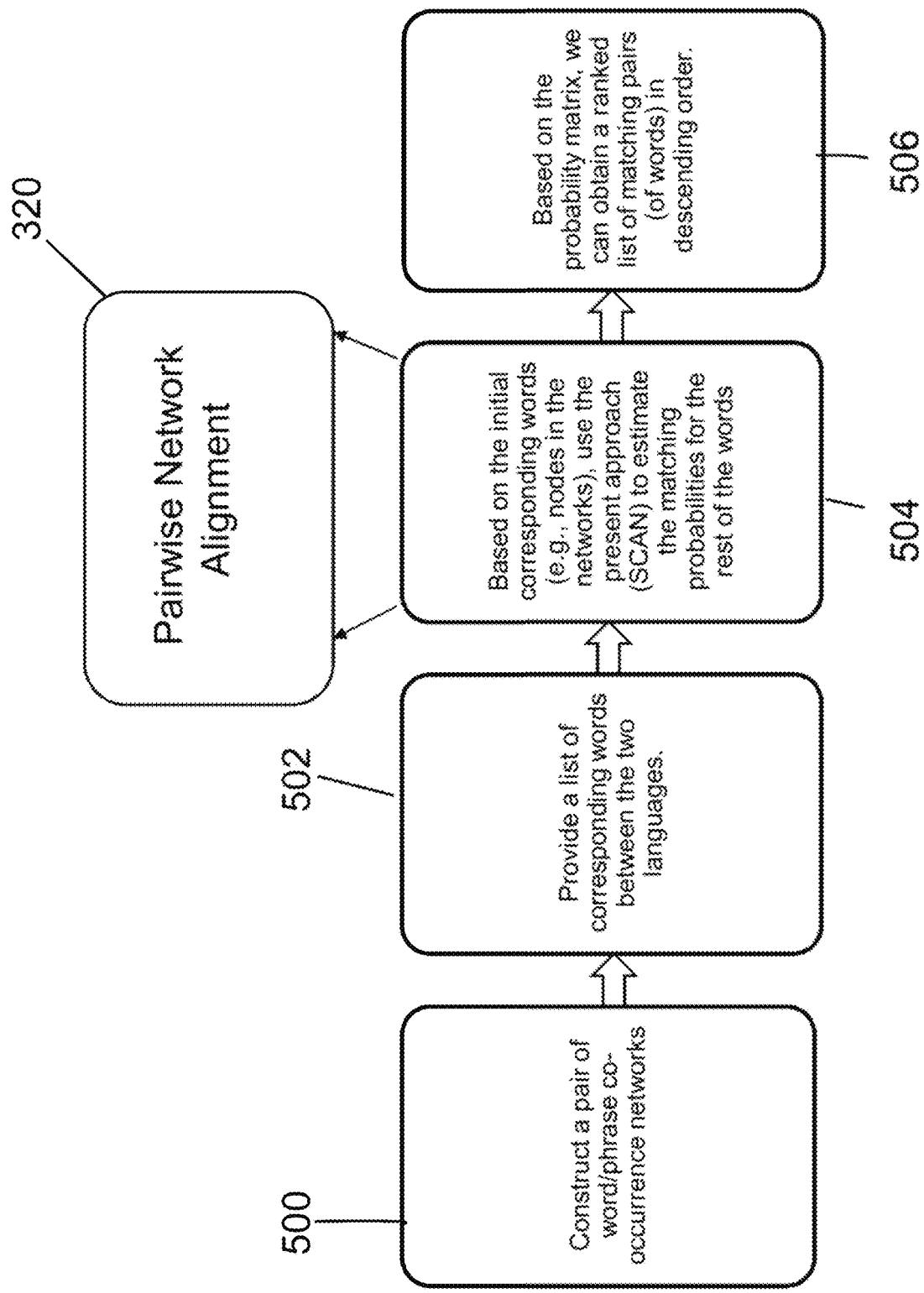
FIG. 5 is a flowchart illustrating an example implementation where the system is used for machine translation between two language.

As can be appreciated by those skilled in the art, there are many other potential applications in which the method can be implemented, including protein-protein interaction network alignment and machine translation between different language corpora. For example and as depicted in FIG. 5, the system can be used for machine translation between two languages based on a small set of parallel corpora. This is particularly useful if one desires to translate words between a high-resource language to a low-resource language. As a non-limiting example, high-resource languages are the ones that are widely used across the world (e.g., English, Chinese, Spanish, French etc. (e.g., greater or equal to 1% of the human population, or any other predefined number given the particular use and acceptable limits)), whereas low resource languages are the ones used by a small population (e.g., Romanian, Persian, Polish, and Thai (e.g., less than 1% of the human population, or any other predefined number given the particular use and acceptable limits)).

Based on a small set of corresponding words between the two languages, the system can effectively identify the correspondence between the rest of the words (i.e., effectively propagate the semantic meanings from one language to the other). As shown in FIG. 5, such a process begins by constructing 500 a pair of word/phrase co-occurrence networks (e.g., one for each language), where nodes indicate words/phrases and edge indicate co-occurrence (at paragraph/corpus level). Next, the system provides a list 502 of corresponding words between the two languages. This can be done manually or by using a translation tool for a small number of words/phrases. Based on the initial corresponding words (e.g., nodes in the networks), the system uses the approach of the present disclosure (SCAN) to estimate 504 the matching probabilities for the rest of the words (e.g., output is a probability matrix indicating the likelihood of matching words). This is accomplished using the pairwise network alignment process 320 as described above. Based on the probability matrix, the system can obtain a ranked list of matching pairs (of words) 506 in descending order. The high-ranked pairs essentially indicate the translation between words in two different languages. Thus, the output in this example is a translation between words in the two different languages.

Figure 6:
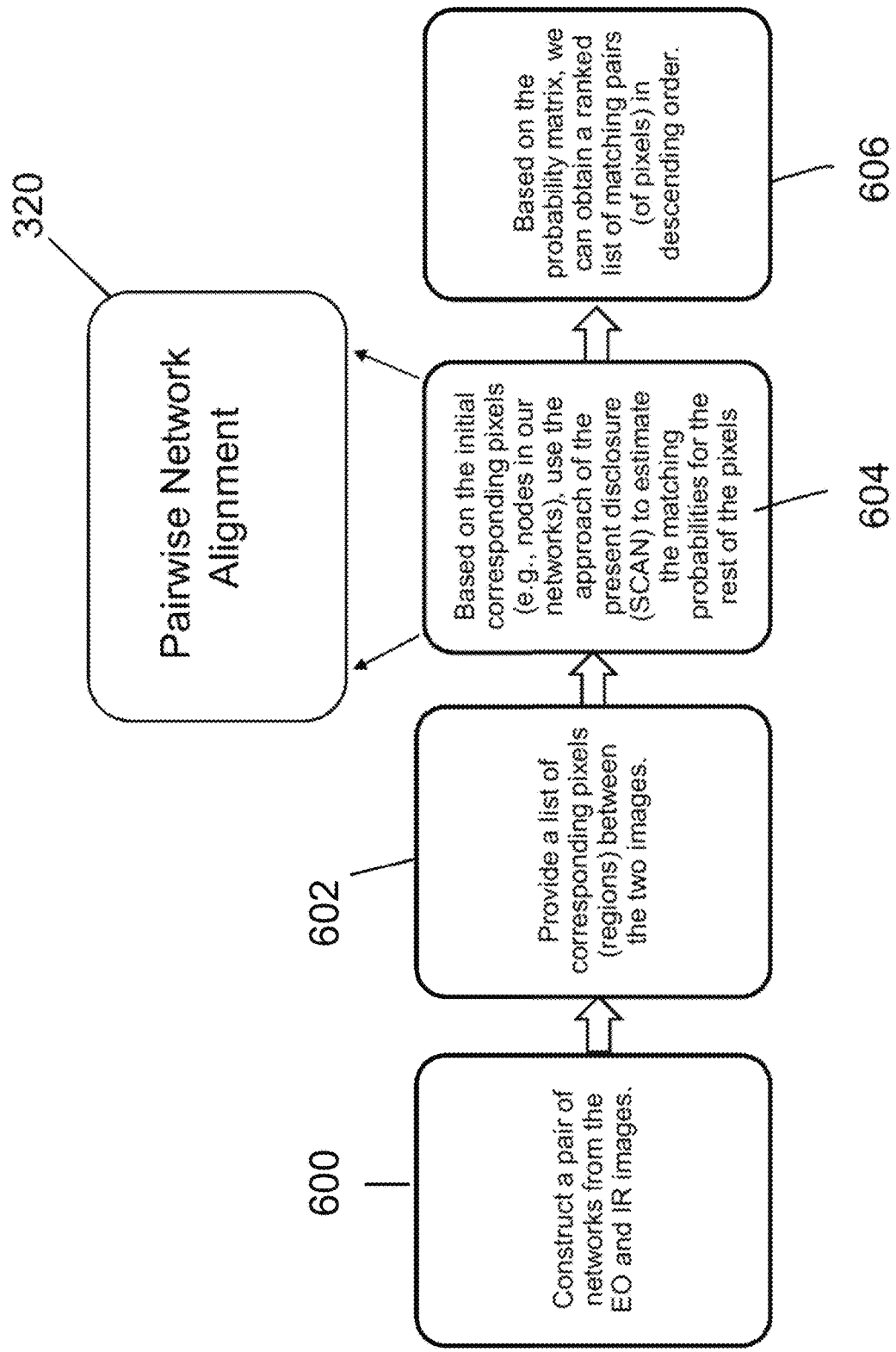
FIG. 6 is a flowchart illustrating an example implementation wherein the system is used for multimodal image registration.

As yet another example and as depicted in FIG. 6, the system can be used for multimodal image registration (such as aligning or registering images taken in multiple modalities, such electro-optical (EO) and infrared (IR) images or data). Based on a small set of corresponding pixels (or regions) between the two images, the system can effectively identify the correspondence for the rest of the pixels (or regions) (i.e., effectively aligning the two). In this implementation, the system begins by construct a pair of networks 600 from the EO and IR images (or images or data from any other modality). The nodes correspond to pixels (or small image regions), while the edges indicate spatial neighbors of a pixel (or a image region). In this aspect, a node connects to its k-nearest neighbors. The system then provides a list 602 of corresponding pixels (regions) between the two images. This can be done by manually choosing salient points of the images, such as corners. Based on the initial corresponding pixels (e.g., nodes in the networks), the system uses the approach of the present disclosure (SCAN) to estimate 604 the matching probabilities for the rest of the pixels (e.g., output is a probability matrix indicating the likelihood of matching pixels). This is accomplished using the pairwise network alignment process 320 as described above. Based on the probability matrix, the system obtains a ranked list of matching pairs (of pixels) 606 in descending order. The high-ranked pairs essentially indicate the correspondence between pixels in the two multimodal images. Thus, the output in this example is correspondence mapping between pixels in the two multimodal images. This can be used for a variety of aspects, such modifying the two images by swapping one or more pixels between the two images.

As another example, the system can be implemented on a social media platform to align networks with disparate types of node attributes. For instance, in the context of social networks, one network may have gender and height as the node/user attributes, while another network may have hobby and income as node attributes. The system then interacts with and modifies the social networks by aligning and/or linking the two networks, such as by adding or modifying the node/user attributes from one network to the other such that the two networks are aligned and consistent with one another.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for pairwise network alignment, the system comprising:
one or more processors and a memory, the memory being a non-transitory computer-readable medium having executable instructions encoded thereon, such that upon execution of the instructions, the one or more processors perform operations of:
receiving datasets from two networks, each network having a plurality of nodes;
embedding the two networks based on multi-layer graph convolution with a graph convolution network to generate network embeddings;
generating an inner product similarity score between the two networks based on an inner product of the network embeddings; and
estimating a node correspondence between the two networks using a SoftMax function on the inner product similarity score; and
aligning the two networks based on the node correspondence.

2. The system as set forth in claim 1, wherein the two networks are social media platforms and aligning the two networks includes modifying nodes by adding user attributes to nodes in each of the social media platforms such that user attributes are common to both social media platforms.

3. The system as set forth in claim 1, wherein the two networks are embodied as two different languages, such that aligning the two networks results in a translation between words in the two different languages.

4. The system as set forth in claim 1, wherein the two networks are embodied as two images from distinct modalities, each of which has a plurality of pixels, such that aligning the two networks results in a mapping between pixels in the two images.

5. The system as set forth in claim 4, further comprising an operation of modifying the two images by swapping one or more pixels between the two images.

6. A computer program product for pairwise network alignment, the computer program product comprising:
a non-transitory computer-readable medium having executable instructions encoded thereon, such that upon execution of the instructions by one or more processors, the one or more processors perform operations of:
receiving datasets from two networks, each network having a plurality of nodes;
embedding the two networks based on multi-layer graph convolution with a graph convolution network to generate network embeddings;
generating an inner product similarity score between the two networks based on an inner product of the network embeddings; and
estimating a node correspondence between the two networks using a SoftMax function on the inner product similarity score; and
aligning the two networks based on the node correspondence.

7. The computer program product as set forth in claim 6, wherein the two networks are social media platforms and aligning the two networks includes modifying nodes by adding user attributes to nodes in each of the social media platforms such that user attributes are common to both social media platforms.

8. The computer program product as set forth in claim 6, wherein the two networks are embodied as two different languages, a high-resource language and a low-resource language, such that aligning the two networks results in a translation between words in the two different languages.

9. The computer program product as set forth in claim 6, wherein the two networks are embodied as two images from distinct modalities, each of which has a plurality of pixels, such that such that aligning the two networks results in a mapping between pixels in the two images.

10. The computer program product as set forth in claim 9, further comprising an operation of modifying the two images by swapping one or more pixels between the two images.

11. A computer implemented method for pairwise network alignment, the method comprising an act of:
causing one or more processors to execute instructions encoded on a non-transitory computer-readable medium, such that upon execution, the one or more processors perform operations of:
receiving datasets from two networks, each network having a plurality of nodes;
embedding the two networks based on multi-layer graph convolution with a graph convolution network to generate network embeddings;
generating an inner product similarity score between the two networks based on an inner product of the network embeddings; and
estimating a node correspondence between the two networks using a SoftMax function on the inner product similarity score; and
aligning the two networks based on the node correspondence.

12. The method as set forth in claim 11, wherein the two networks are social media platforms and aligning the two networks includes modifying nodes by adding user attributes to nodes in each of the social media platforms such that user attributes are common to both social media platforms.

13. The method as set forth in claim 11, wherein the two networks are embodied as two different languages, such that aligning the two networks results in a translation between words in the two different languages.

14. The method as set forth in claim 11, wherein the two networks are embodied as two images from distinct modalities, each of which has a plurality of pixels, such that such that aligning the two networks results in a mapping between pixels in the two images.

15. The method as set forth in claim 14, further comprising an operation of modifying the two images by swapping one or more pixels between the two images.

\* \* \* \* \*